Feb. 12, 1952 J. H. LESSARD ET AL 2,585,020
ART OF MAKING CRACKED ICE
Filed July 26, 1948 3 Sheets-Sheet 1

Inventors
JAMES H. LESSARD
& GERALD M. LEES
by Edward E. Barnett
Attorney

Feb. 12, 1952   J. H. LESSARD ET AL   2,585,020
ART OF MAKING CRACKED ICE

Filed July 26, 1948   3 Sheets-Sheet 2

JAMES H. LESSARD &
GERALD M. LEES Inventors

Attorney

Feb. 12, 1952 J. H. LESSARD ET AL 2,585,020
ART OF MAKING CRACKED ICE
Filed July 26, 1948 3 Sheets-Sheet 3
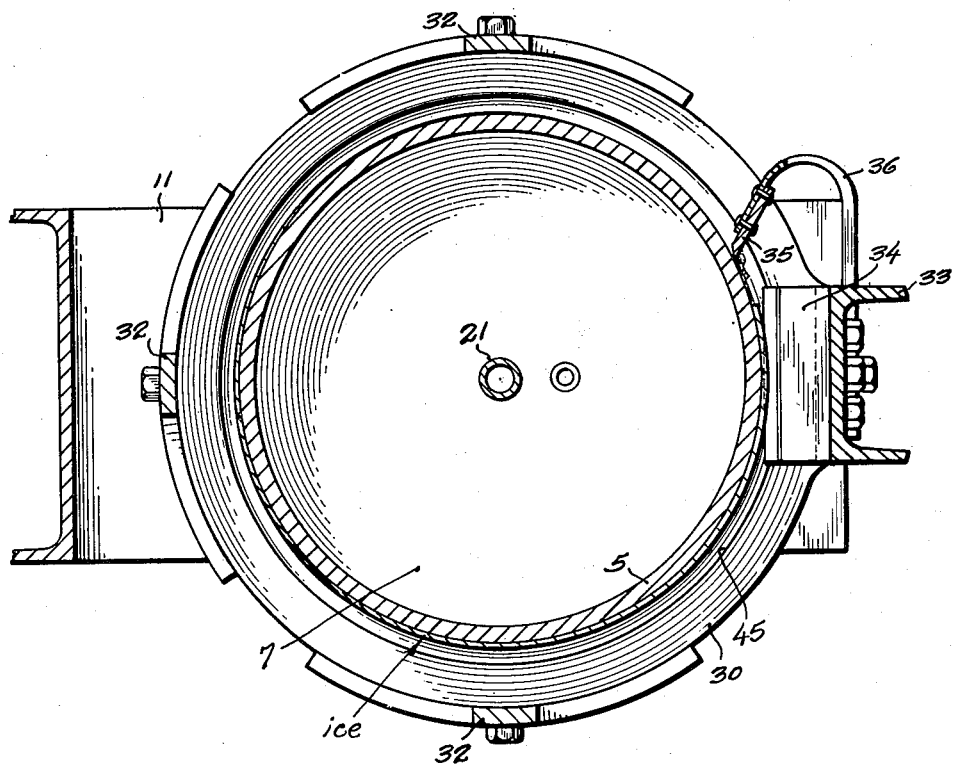
Fig. 4.
JAMES H. LESSARD &
GERALD M. LEES
Inventors
Attorney Patented Feb. 12, 1952

2,585,020

UNITED STATES PATENT OFFICE 2,585,020

ART OF MAKING CRACKED ICE

James H. Lessard and Gerald M. Lees, Seattle, Wash.; said Lees assignor to said Lessard Application July 26, 1948, Serial No. 40,646

15 Claims. (Cl. 62—106)

This invention relates to the ice-making art, and for its general object aims to provide a perfected machine and method for continuously making a sheet of ice and producing therefrom usable ice in cracked form. The invention assures an inexpensive and constant source of supply for cracked ice, and especially lends itself to use by packers and shippers concerned with the handling of perishable food products, as well as by hotels, restaurants, cocktail bars and other like establishments who commonly use considerable quantities of cracked ice in the preparation of various drinks as well as in the serving of numerous food preparations, such, for example, as salads and cocktails.

Generally considered, the present invention is of that nature in which water is frozen upon the surface of a drum and the produced sheet subjected to the action of wedging knives for cracking the sheet into multiple chips. There have been heretofore devised a number of machines which may be said to employ this basic technique, and these prior machines, for coating the surface of the drum with a sheet of water, have relied either upon a dipping step or upon a spraying step. In practicing the dipping procedure the drum is caused to turn in a body of water, which has not been too satisfactory in point of output from the fact that the drum produces only a very thing layer of ice. This is largely due to the tendency of the freezing sheet of ice to continually draw heat from the surrounding water bath. As to those machines which apply the water by spraying, this also lessens the output as well as producing an inferior product in that globules of ice rather than a uniform thickness sheet inherently develop. Over and above these disadvantages the prior ice-making machines of the nature here referred to have shown an inability to produce a dry type of cracked ice, the product being usually quite watery and this perforce lessens the value of the ice as a cooling medium. The present invention especially aims to devise a machine overcoming the above disadvantages. Other particular objectives will appear and be understood in the course of the following description and claims, the invention consisting in the new method and in the construction, adaptation and combination of parts of a machine for practicing the method, hereinafter described and claimed.

In the accompanying drawings:

Figure 4 is a horizontal sectional view on line 4—4 of Fig. 1.

Figure 1:
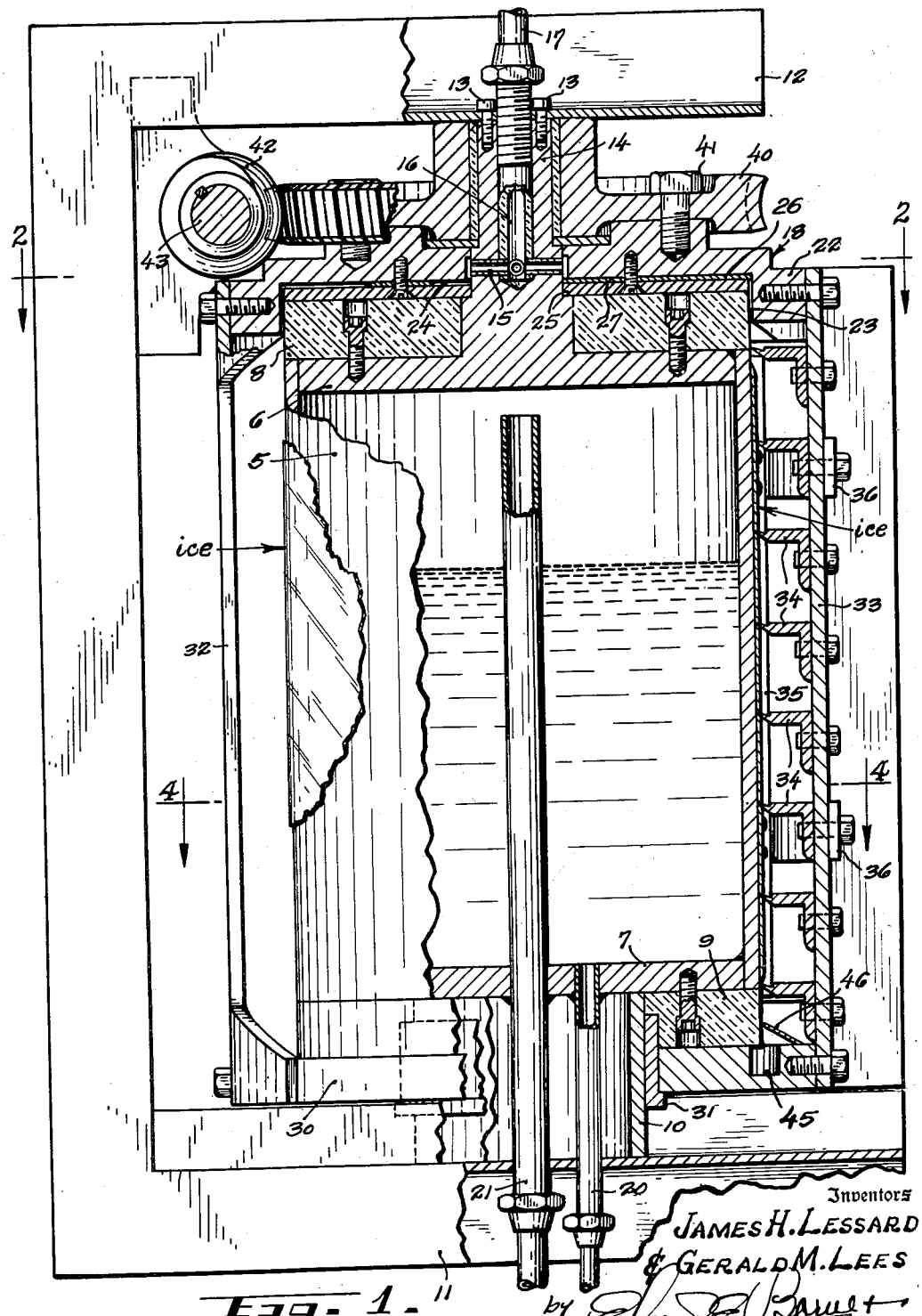
Figure 1 is a view partly in vertical section and partly in elevation illustrating an ice-making machine constructed to embody the preferred teachings of the present invention, the view being fragmentary to the extent that pipes handling the refrigerant and the introduced water are broken away.
Figure 2:
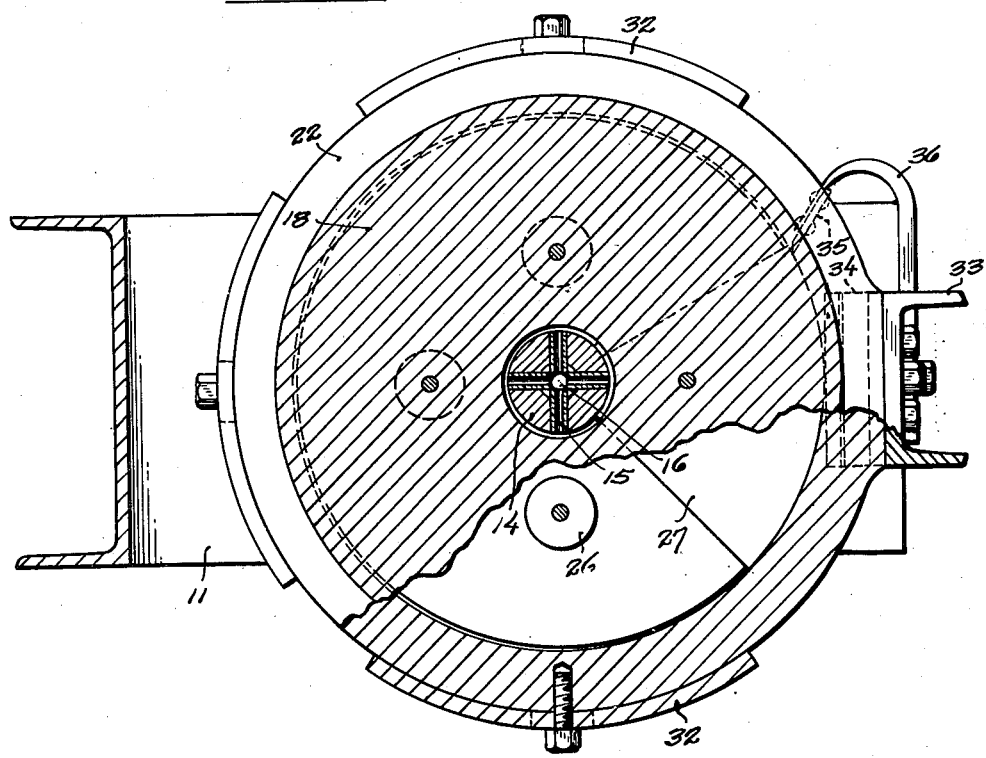
Figure 2 is a horizontal sectional view on line 2—2 of Fig. 1.
Figure 3:
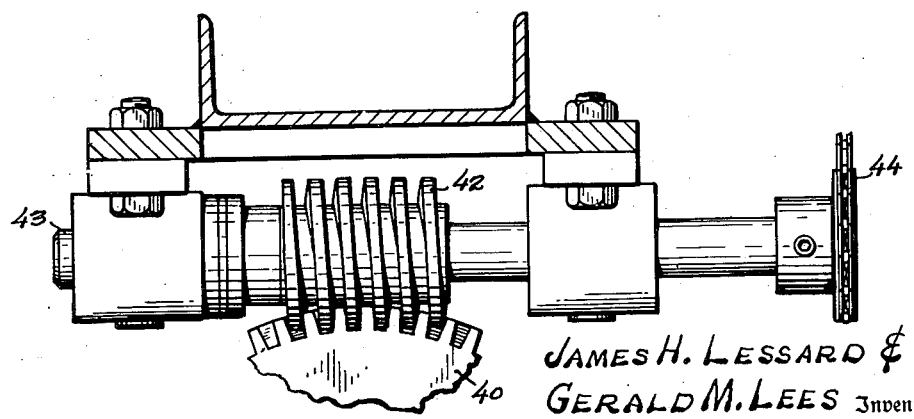
Figure 3 is a fragmentary top plan view taken to an enlarged scale to detail the drive structure of the machine.

According to the present invention, there is provided a hollow cylindrical drum indicated by the numeral 5 and which is mounted to locate its axis perpendicular. Being desirably formed from a metal high in heat conductivity, the drum is closed at both ends by top and bottom headers 6 and 7, and there are secured to these headers as overlaying facings therefor annular blocks 8 and 9 composed of Bakelite or other suitable insulating material. The drum has a centrally placed tubular neck 10 integrated with and depending from the bottom header, and this neck foots upon and is made secure to the base principal 11 of a rigid frame indicated as being fabricated from channel-iron stock. The frame, considered in side elevation, takes the general form of the letter C and is applied much in the nature of a yoke with the upper arm reaching over and rigidifying the head end of the drum. This reach arm, designated by 12, connects by bolts 13 to a stem 14 projecting upwardly as an axial prolongation of the top header 6. Drilled diametrically through said stem at a point elevated somewhat above the upper level of the insulating block 8 are intersecting cross-ducts 15 each suitably fitted with an insulating liner, and there is drilled from the head end of the stem to connect with these cross-ducts a center-bore 16 which, likewise, is lined with insulating material. A pipe 17 connects by suitable fittings with this centerbore and leads from a pressure source of water supply to feed a constant flow of pressure water into the center-bore, the water being delivered therefrom through the cross-ducts into a water head 18 hereinafter to be described. From the water head the water is caused to be discharged downwardly as a substantially unbroken stream over the perimeter of the drum and is converted thereon into an ice sheet by transfer of heat through the wall of the drum to a liquid body of refrigerant contained in the drum. This refrigerant, which is or may be Freon, is introduced to the drum through a pipe 20 and the gas which boils off from the liquid refrigerant is withdrawn through a pipe 21.

Reverting to the water head, the same is journal-mounted for rotation about the stem as an axis and is of an annular configuration presenting a depending peripheral flange 22 which skirts the head end of the drum or, more especially, the insulating block 8 applied thereto. The inside diameter of the flange slightly exceeds the outside diameter of the annular insulating block, consequently describing therebetween a narrow slit 23 which completely surrounds the block, and this slit connects through a major portion of its circumferential extent with a water-supply chamber 24 provided in the water head. To produce this water-supply chamber, the bottom cavity of the water head defined by the circumscribing flange 22 has a substantially flat ceiling, and there is bolted or otherwise secured to this face, with intervening spacers, an annular disc 25 having a diameter substantially corresponding to the diameter of the drum. The employed spacers comprise a severalty of washers 26 and a sectoral plate 27, and this plate, which extends to the extreme outer limits of the cavity and hence overlies the slit, has as its function the blocking off of the slit 23 through a portion of its circumference.

Designated by 30 and journal-mounted upon a bushing 31 to occupy a position below the drum is a disc produced to a diameter corresponding to the extreme outer limit of the water-head, and there are secured as stringers between this disc and the water-head a plurality, four being shown, of longitudinally extending tie-bars, thus providing by the complement of the water-head, the disc and the tie-bars a substantial lantern cage. Three of these tie-bars, designated by 32 in each instance, serve only as stiffening arms, and the remaining bar 33, which desirably is reinforced through the instrumentality of employing a channel-iron, serves as a support for the mounting of a multiplicity of ice-cracking knives 34. This bar 33 is so located within the circumference of the lantern cage as to lie more or less central to the arcuate span of the sectoral plate 27, the placement, in more particularity, being preferably such as positions the longitudinal center line of the bar on a radius of the water-head lying some 50° to the rear of the leading edge of the plate.

The ice-cracking knives desirably are made from angle-iron stock with one leg bearing upon and bolted to the inside face of the mounting bar, and with the other leg projecting horizontally inwardly therefrom into approximate touching relation to the perimeter of the drum. The touching lip lies substantially tangent to the perimeter of the drum and presents two converging ground faces the lower of which lies at an angle of approximately 39° from the horizontal and the upper of which lies at an angle of approximately 15° from the said lower face, both of these ground faces being slanted upwardly toward the edge. These angles, while found by experiment to be the most effective in accomplishing the required wedging action which we rely upon for cracking the ice sheet are not deemed to be so critical as to preclude a minor departure therefrom but it is to be here pointed out that both of the wedge faces should desirably slope in a corresponding direction of acclivity and they should be so ground that the median of the two faces lies at an angle of very nearly 45° from the horizontal. Carried in trailing relation to the cracking knives and supported to lie perpendicular to the drum and angular to a radius of the latter is a drag blade 35, and as a mounting therefor which will give a certain degree of resiliency we rivet or otherwise firmly secure the blade to the free ends of two goosenecked arms 36 bolted to the bar 33. The office of this drag blade, if properly it can be called a blade in that the inner edge is blunt, is to knock off loosened fragments of projecting ice which may adhere to the drum and which, if allowed to remain, would interfere with the approaching water curtain to the extent of causing splits in the descending stream.

From the foregoing it will be understood that the drum 5 is held stationary and that the lantern cage composed of the water head 18, the trundles 32—33, and the bottom disk 30 rotates about the same. This rotation is accomplished through any suitable driving mechanism, the mechanism illustrated comprising a worm wheel 40 bolted, as at 41, to the water-head and meshing a worm 42 keyed upon a horizontal shaft 43 which is driven by a chain (not shown) working about a sprocket wheel 44, the rotational speed of the lantern cage being desirably in the neighborhood of 1 R. P. M. As the lantern cage turns, water under a pump pressure of, say, 2# p. s. i. is delivered through the center-bore 16 and its connecting cross-ducts 15 into the water-supply chamber 24 and feeds therefrom into the throat 23, wherefrom the water courses downwardly in a substantially unbroken stream covering so much of the slit's entire circumference as is not blocked off by the sectoral plate 27. As this stream passes over the chilled surface of the drum the same is frozen to develop a solid sheet of ice which is of zero thickness along a perpendicular line taken through the trailing edge of the sectoral plate and which progressively increases in thickness circumferentially of the drum in a direction counter to the rotational movement of the cage. The volume of water supplied through said feed orifice 23 should be somewhat greater than the freezing capacity, and it will be seen that we provide a circumferential canal 45 at the base of the drum into which this excess water flows. This canal is formed in the upper face of the disk 45 and other than for a baffle plate 46 which overlies the same in the area of the cracking knives the canal is open throughout the entire circumference of the drum. While not shown in the drawing a sump line leads from this canal to a pick-up basin wherefrom the excess water is picked up by the water-supply pump and returned for re-use to the water head 18.

As the lantern cage turns, the knives 34 are caused to work progressively about the circumference of the drum and it perforce follows that the tangentially placed knife edges cut into the wide end of the ice sheet at spaced intervals of the perpendicular length and by the wedge action of the top and bottom faces of the knives cause the ice to be broken off in myriad pieces, the trailing drag blade freeing the surface of any small fragments which may adhere. It will be noted that the end limit of the downwardly coursing stream of water which is fed from the orifice 23 leads the cracking knives by some 50° and the purpose thereof is to establish a momentary interval before cracking takes place during which time the freezing of the relatively thick tail end of the ice sheet will be carried on free of the presence of liquid water, and it is by this procedural step that the present invention obtains a superior grade of cracked ice characterized by the fact of its being in a completely dry state.

Aside from this provision of dry ice, perhaps the outstanding feature of the present invention is the ability to form upon the drum a substantially continuous sheet of ice entirely free of dry areas and increasing in thickness uniformly throughout its extent. In order to accomplish this end, it becomes necessary that the water flowing through the feed orifice 23 be an unbroken stream free of turbulence and that its velocity be such as to properly compensate for surface tension. The factors which enter into a consideration of a drum's surface tension are the mass (M) of the particle concerned, the velocity (V) of flow in a direction angular to the curve of the drum, and the radius (R) of the drum surface. The force opposing the surface tension is stated by the equation $$\frac{MV^2}{R}$$

and the velocity factor consequently is of prime import in that, appearing in the equation as the square of its value, a small increase is of greater moment insofar as overcoming surface tension than a proportionate increase of mass. Moreover, it becomes undesirable to increase the mass much beyond freezing capacity due to the power loss incident to recirculating a large volume of water. It has been our finding that the objectionable rivulets which may be attributed in large part to surface tension may be effectively eliminated in a machine employing, say, a drum of 8" diameter by delivering the water through a feed orifice of .008" at a velocity of 3 F. P. S. The critical speed is considerably lower than this figure. All other factors being the same, the water stream apparently can be delivered at speeds as low as 1.5 F. P. S. and still avoid the formation of rivulets. Unusually high velocities cause water turbulence.

It is to be here pointed out that the invention lends itself not only to the freezing of water but also to the freezing of other liquids as well. In this respect, experiments have established that the machine of the present invention, modified only in respect of the size of the discharge orifice 23 through which the liquid body is fed to the drum and the pressure to which the same is subjected, is well adapted to the freezing of liquid foods. Fruit and vegetable juices, for example, when freeze-processed by the present machine, are almost indistinguishable from fresh juices when later thawed for use. Experiments have also been conducted with eggs, in which case the body to be frozen is constituted of intermixed yokes and whites stirred together in such a manner as to minimize aeration. We have found, from these experiments, that it is desirable to perform the freezing operation in a properly conditioned atmosphere, a dry atmosphere being called for in the instance of eggs whereas, with orange juice, it is advantageous in order to minimize deterioration of the juice that the freezing step be performed in an atmosphere almost free of oxygen. Bearing in mind, therefore, that water is but one of many applicable liquids which may be frozen, the term "water" as used throughout the body of the description and in the hereto annexed claims is to be considered as comprehending all applicable liquids.

The invention should be clear from the foregoing detailed description of our now-preferred embodiment, but it is to be understood that changes may be made without departing from the inventive concept and we therefore intend that the hereto annexed claims be given a scope fully commensurate with the broadest interpretation which the employed language fairly permits.

What we claim is:

1. As a machine for making cracked ice, a cylindrical drum mounted to locate its axis vertical and adapting itself to such a chilling of the surface as will establish a quick-freeze condition, means for chilling said surface, a chambered water head mounted above the drum for rotary movement about the center of the latter as an axis and providing an annular delivery throat fed from the chamber and placed concentric to the axis in overlying relation to the perimeter of the drum, means for supplying water under pressure to the chamber, a member mounted below the drum for rotary movement about an axis coinciding with the water head, stringers connecting the water head and said member and acting therewith to define a substantial lantern cage, means for rotating said cage, and a plurality of rather widely spaced knife-edged wedges carried by one of said stringers and operating by rotary movement of the cage to crack the sheet of ice formed upon said chilled surface, the knife edges of said wedges lying tangent to the drum surface and parallel one to another in planes defining right sections of the drum.

2. Structure according to claim 1 in which the last means is of a nature acting by force of wedging pressure to crack the ice sheet.

3. In a machine for making cracked ice, a cylindrical drum mounted to locate its axis vertical and adapted to have its surface chilled to a quick-freeze temperature, means for chilling said surface, a chambered water head mounted above the drum for rotary movement about the center of the latter as an axis and providing an annular delivery throat fed from the chamber and placed concentric to the axis in overlying relation to the perimeter of the drum, means for supplying water under pressure to the chamber, a sectoral plate received within said chamber and blocking off an arcuate portion of the delivery throat, a disk mounted below the drum for rotary movement about an axis coinciding with the water head, stringers connecting the water head and the disk and acting therewith to define a substantial lantern cage, one of said stringers being in radial alignment with the approximate median line of the sectoral plate, means for rotating the cage, and means carried by said mentioned stringer operating by rotary movement of the cage to crack ice forming upon said chilled surface.

4. In a machine for making cracked ice, a cylindrical drum mounted to locate its axis vertical and adapted to have its surface chilled to a quick-freeze temperature, means for chilling said surface, a chambered water head mounted above the drum for rotary movement about the center of the latter as an axis and providing an annular delivery throat fed from the chamber and placed concentric to the axis in overlying relation to the perimeter of the drum, means for supplying water under pressure to the chamber, a sectoral plate received within said chamber and blocking off an arcuate portion of the delivery throat, a disk mounted below the drum for rotary movement about an axis coinciding with the water head, stringers connecting the water head and the disk and acting therewith to define a substantial lantern cage, one of said stringers being in radial alignment with the approximate median line of the sectoral plate, means for rotating the cage, and a plurality of wedging knives carried by said mentioned stringer to lie at spaced intervals of the length thereof and operating by rotary movement of the cage to crack ice forming upon said chilled surface.

5. The structure of claim 4 in which the functional edges of said wedging knives extend horizontally on a substantial tangent of the drum.

6. The structure of claim 4 in which the functional edges of said wedging knives extend horizontally on a substantial tangent of the drum and in the instance of each said knives have their wedge faces each sloped in a corresponding direction from the horizontal.

7. A machine for making cracked ice comprising the combination of a vertically disposed cylindrical drum adapted to have its surface chilled to a quick-freeze temperature, means for chilling said surface, means for applying water to the chilled surface to produce a sheet of ice thereon, and a wedging knife for cracking the ice sheet mounted for relative rotary movement about the circumference of the drum, the functioning edge of said knife lying tangent to the drum surface in a plane which defines a right section of the drum, the knife being so formed and disposed that both wedging faces slope downwardly from said functioning edge, thus causing the upper of said faces to recede from the functioning edge and consequently relieve the ice of any lifting force as said knife penetrates the ice in the performance of its cracking function.

8. A machine for making cracked ice comprising, in combination: a vertically disposed cylinder presenting a rigid freezing surface, means for supplying to said surface liquid which is to be frozen for producing a coating of ice thereon, a plurality of wedging knives arranged to cut into said ice coating for cracking the latter and disposed at spaced intervals of the length of the cylinder with the functioning edges disposed tangent to the freezing surface in planes coinciding with right sections of the cylinder, and means for establishing relative motion between said knives and the cylinder to cause the knives to progressively advance circumferentially of the cylinder, the upper and lower wedging faces of said knives being both sloped downwardly from said functioning edge so as to relieve the ice of any lifting force as said knife penetrates the ice in the performance of its cracking function.

9. In a machine for making cracked ice, a hollow vertically disposed cylindrical drum closed at the ends and having its cylindrical wall composed of a material high in heat conductivity, means for establishing circulation of a refrigerant fluid into and from the closed interior of said drum, an annular insulating plate rigidly secured in contiguous surmounting relation to the drum and having its rim located flush with the latter, an annular hood supported in co-axial overlying relation to the plate, said hood being formed with a peripheral skirting flange having an inside diameter slightly larger than the outside diameter of the insulating plate and which surrounds said plate so as to describe a narrow circumferentially extending open-bottom throat between the plate and the skirt, the thickness of said insulating plate being greater than the depth of the throat so that the bottom opening of the throat will be spaced above the upper limit of the drum's chilling surface, a source of supply from which liquid which is to be frozen is fed under pressure to the upper end of said throat for delivery from the open bottom thereof over the chilled cylindrical surface of the drum, means occupying and blocking off an arcuate portion of said throat, means establishing relative rotation as between the drum and said throat-blocking means about the center of the drum as an axis, and means fixed with respect to said throat-blocking means and occupying a position directly below the latter for cracking liquid delivered from the throat and frozen as ice upon the surface of the drum.

10. As a machine for making cracked ice, a cylindrical drum mounted to locate its axis vertical and arranged to have its surface chilled to a quick-freeze temperature, means for chilling said surface, a chambered head overlying said drum and providing an open-bottom elongated delivery throat fed from the chamber of said head with the liquid which is to be frozen and characterized in that one of the two walls which define said throat extends upwardly as a flush continuation of the drum's chilled surface and the other said wall is disposed parallel with and spaced only slightly from said flush wall, means for supplying the liquid to be frozen under constant predetermined pressure to the chamber of said head for delivery through said throat to have the issuing stream flow downwardly as a broad and substantially unbroken thin sheet over the surface of the drum, wedging means operative by rotary movement relative to the drum to crack ice which forms upon said chilled surface, and means for establishing said relative rotary movement.

11. In the ice-making art, a cylindrical drum mounted to locate its axis vertical and arranged to have its surface chilled to a quick-freeze temperature, means for chilling said surface, a source of supply of the liquid which is to be frozen, a chambered head adapted to receive liquid from said source and providing an open-bottom elongated delivery throat fed from the chamber of said head and characterized in that one of the two walls which define said throat extends upwardly as a flush continuation of the drum's chilled surface and the other said wall is disposed parallel with and spaced only slightly from said flush wall, the circumferential span of said throat being less than the full-circle compass of the chilled surface, means for supplying liquid from said source to the chamber of the head under a constant predetermined pressure for delivery through said throat to have the issuing liquid flow downwardly as a substantially unbroken curtain over said chilled surface, means for establishing relative rotary movement as between the drum and the throat, and wedging means operative by rotary movement relative to the drum to crack the film of ice formed upon said chilled surface, the wedging means being movable relatively in unison with the head and being located to occupy a position circumferentially removed from the surface area of the drum over which the curtain of liquid is flowing.

12. In a machine for making cracked ice, a cylindrical drum mounted to locate its axis vertical and presenting an annular surface chilled to a quick-freeze temperature, a source of supply of the liquid which is to be frozen, means for supplying from said source to the chilled surface a downflowing stream of liquid so fashioned as to substantially curtain a major part of the perimeter of said surface less than the full circumference thereof, said means comprising an open-bottom annular delivery throat located above and placed concentric to the drum pressure-fed with liquid from said source, and characterized in that one of the two walls which define the throat extends upwardly as a flush continuation of the drum's chilled surface while the other wall is parallel with and spaced only slightly from said flush wall, the throat having dam means therein serving to block off an arcuate portion of the throat's full circumferential span, means for establishing relative rotation as between the drum and said dam means, and means acting to crack ice which forms upon the chilled surface and occupying a position fixed in relation to the dam means directly below the latter.

13. In the ice-making art, a member providing a vertical freezing surface chilled to a quick-freeze temperature, a source of supply of the liquid which is to be frozen, a head supplied with liquid from said source and providing an open-bottom throat overlying said chilled surface and to which said supplied liquid is delivered so as to issue from the open bottom and flow downwardly along the vertical length of the freezing surface, one of the two walls which define said throat extending upwardly as a flush continuation of the chilled surface and the other said wall being disposed parallel with and spaced only slightly from said flush wall, and means for removing ice which congeals upon said freezing surface.

14. The ice-making machine of claim 13 in which said flush wall of the delivery throat is thermally insulated from the freezing surface so as to safeguard the liquid from freezing as it traverses said narrow throat.

15. In a machine for making cracked ice, a hollow vertically disposed cylindrical drum closed at the ends and having its cylindrical wall composed of a material high in heat conductivity, means for establishing circulation of a refrigerant fluid into and from the closed interior of said drum, an annular insulating plate rigidly secured in contiguous surmounting relation to the drum and having its rim located flush with the latter, an annular hood supported in co-axial overlying relation to the plate, said hood being formed with a peripheral skirting flange having an inside diameter slightly larger than the outside diameter of the insulating plate and which surrounds said plate so as to describe a narrow circumferentially extending open-bottom throat between the plate and the skirt, the thickness of said insulating plate being greater than the depth of the throat so that the bottom opening of the throat will be spaced above the upper limit of the drum's chilling surface, a source of supply from which liquid which is to be frozen is fed under pressure to the upper end of said throat for delivery from the open bottom thereof over the chilled cylindrical surface of the drum, and means for cracking liquid delivered from the throat and frozen as ice upon the surface of the drum.

JAMES H. LESSARD.
GERALD M. LEES.

REFERENCES CITED

The following references are of record in the file of this patent:

UNITED STATES PATENTS

| Number | Name | Date |
|---|---|---|
| 490,475 | Holden | Jan. 24, 1893 |
| 1,020,759 | Holden | Mar. 19, 1912 |
| 2,080,639 | Taylor | May 18, 1937 |
| 2,150,616 | Thilenius | Mar. 14, 1939 |
| 2,310,468 | Short | Feb. 9, 1943 |
| 2,431,278 | Raver | Nov. 18, 1947 |